Feb. 2, 1960
C. FULOP
2,923,191
POWER OPERATED, PREDETERMINED
TORQUE RELEASE, AXIAL-IMPACT
TYPE HAND TOOL
Filed Oct. 21, 1958
2 Sheets-Sheet 1
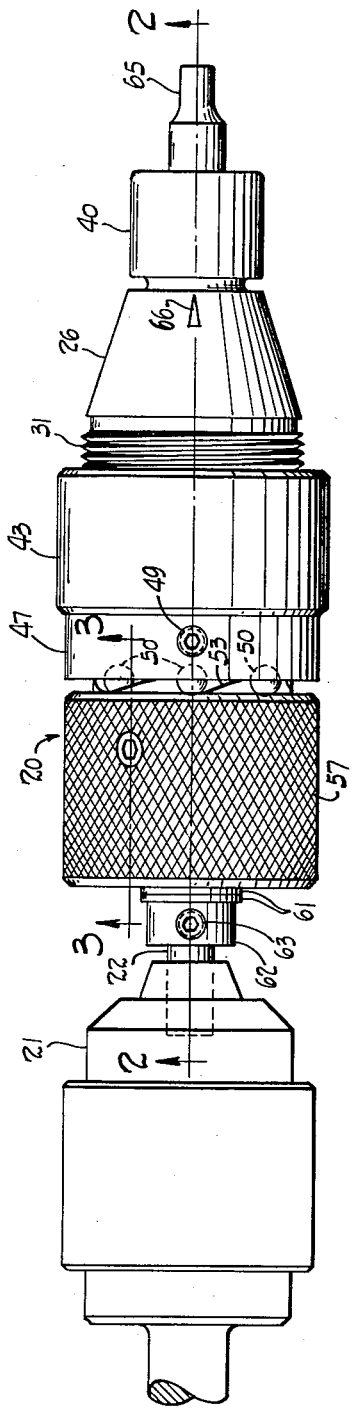
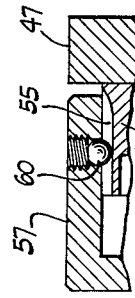
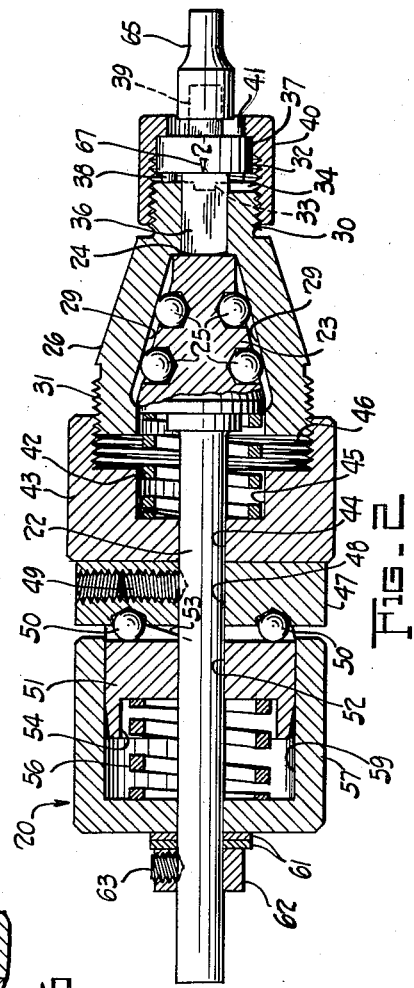
INVENTOR.
CHARLES FULOP
BY
ATTORNEY.

Feb. 2, 1960
C. FULOP
2,923,191
POWER OPERATED, PREDETERMINED
TORQUE RELEASE, AXIAL-IMPACT
TYPE HAND TOOL
Filed Oct. 21, 1958
2 Sheets-Sheet 2
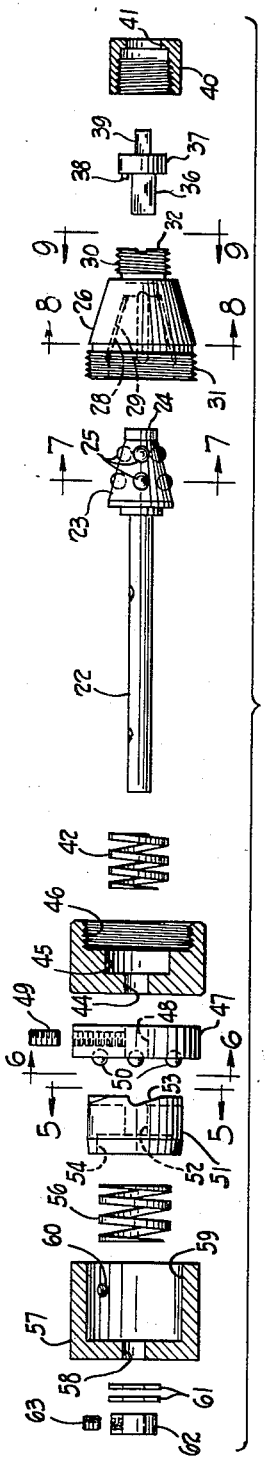
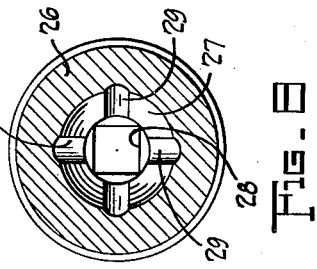
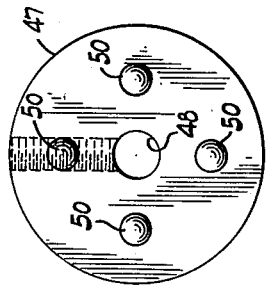
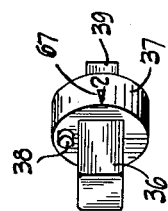
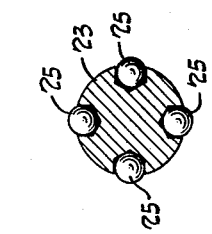
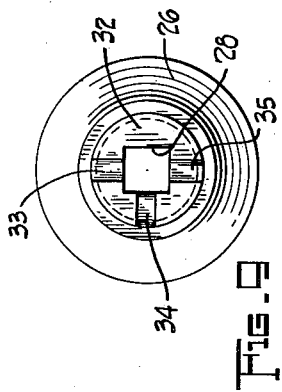
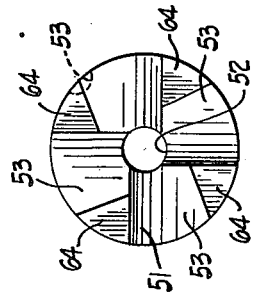
INVENTOR.
CHARLES FULOP
BY
Sanford Schumacher
ATTORNEY.

United States Patent Office 2,923,191
Patented Feb. 2, 1960

2,923,191

POWER OPERATED, PREDETERMINED TORQUE RELEASE, AXIAL-IMPACT TYPE HAND TOOL

Charles Fulop, Seven Hills, Ohio

Application October 21, 1958, Serial No. 768,724

5 Claims. (Cl. 81—52.35)

This invention relates to bolt driving implements and particularly to a combination impact-drive screw driver with an adjustable torque clutch.

Conducive to a better understanding of this invention it may be well to point out that in driving so-called "self-tapping" screws into cement, cinder block or similar granular material, such as described in my co-pending application Serial No. 515,818 filed June 16, 1955 and entitled "Self Tapping Screw for Cement and Cinder Blocks and Similar Granular Materials," both a rotating and hammering action is necessary to drive such a screw to its full depth. Once the threads have begun to be cut into the block, the resistance of the granular material to further penetration and rotation of the screw may build up to the point that the screw body will be sheared off unless the rotation is stopped short of the shear torque.

Such a point may be reached before the screw is driven to the required depth, thereby requiring a hammering action to break the grip on the screw threads and permit further penetration and rotation of the screw into the cement block, until the desired depth is reached.

Again, a hammering action is necessary when starting such a screw in order to create a hole in the material at the screw point to a depth such that the screw threads may take a firm bite into the material.

The primary object of this invention, therefore, is to provide a combination impact hammer and screw driver for driving self-tapping screws into granular materials such as cement and cinder block.

Another object is to provide a device that will automatically and alternately rotate or hammer a screw of the type stated, depending upon whether the screw is being rotated below or at a pre-set maximum torque.

A further object is to provide a screw driver of the type stated having a clutch that will convert the action of the device from a rotary one to a hammering one at a pre-determined torque.

Still another object is to provide a device of the type stated having manually controlled means for simultaneously creating a hammering action while the drive spindle continues to rotate over the full torque range, from zero to the maximum of which the device is capable.

These and other objects of the invention will become apparent from a reading of the following specification and claims together with the accompanying drawings, wherein:

Figure 1 is a top plan view of the combination impact-drive screw driver that is the subject of this invention showing it mounted in the chuck of a conventional electric drill;

Figure 2 is a longitudinal sectional view of the device taken along the line and in the direction of the arrows 2—2 of Figure 1;

Figure 3 is a sectional view through the manual impact control taken along the line and in the direction of the arrows 3—3 of Figure 1;

Figure 4 is an exploded view of the device;

Figure 5 is a right end view of the manual hammer cam taken along the line and in the direction of the arrows 5—5 of Figure 4;

Figure 6 is a left end view of the manual hammer anvil plate taken along the line and in the direction of the arrows 6—6 of Figure 4;

Figure 7 is a cross-sectional view of the clutch hammer head taken along the line and in the direction of the arrows 7—7 of Figure 4;

Figure 8 is a cross-sectional view through the body of the device taken along the line and in the direction of the arrows 8—8 of Figure 4;

Figure 9 is a right end view of the body looking in the direction of the arrows 9—9 of Figure 4; and, Figure 10 is a perspective view of the socket anvil post.

Referring more particularly to the drawings there is seen in Figure 1 the combination impact-drive screw driver that is the subject of this invention, broadly indicated by reference numeral 20.

The screw driver 20 is intended for use with a power drive.

In Figure 1 it is shown with its drive shaft 22 engaged by the chuck 21 of a conventional electric drill. However it should be understood that the device could be driven through a flexible shaft or could be made with its own self contained motor.

The device comprises a body member 26 having externally threaded ends 30 and 31 and a frusto-conically shaped cavity 27. A square shaped anvil bore 28 extends axially of the small end of the cavity 27. The bore 28 is surrounded by the external threads 30 of the body member.

Three or more half-round longitudinally extending slots 29 are cut in the face of the cavity 27. In the form of the device illustrated there are four such slots.

Reference numeral 37 indicates a socket wrench post having a square anvil section 36 adapted to fit into the body bore 28 and a socket engaging stud 39. A depth gage pin 38 is mounted on the post 37 adjacent to the anvil section 36 for a purpose to be hereinafter disclosed.

Reference numeral 32 indicates the flat end face of the body member 26 in which the square anvil bore 28 is located. Reference numerals 33, 34 and 35 indicate three radially extending slots of varying depth which are cut in the end face 32 for a purpose to be hereinafter disclosed.

The socket wrench post 37 is seated in the bore 28 by means of its anvil section 36 and is held in place by a cap 40 which engages the threads 30 of the body member 26. The cap 40 has a central bore 41 through which the stud 39 extends as indicated in Figures 2 and 4.

Reference numeral 22 indicates a drive shaft having a frusto-conical clutch member 23 mounted on one end thereof of a size and shape adapted to interfit the frusto-conical cavity 27 in the body member 26.

Reference numeral 25 indicates pairs of aligned ball bearings which are set in the face of the cone clutch 23 and aligned to engage the slots 29 when the clutch member 23 and the body cavity 27 are inter-fitted.

The shaft 22 is mounted on the body 26 with the clutch cone 23 seated in the cavity 27 by means of a cap 43 having internal threads 46 which engage the external threads 31 of the body member 26. The cap 43 has a central bore 44 through which the shaft 22 passes and a counter-bore 45 in which a spring 42 is seated which bears against the large end of the clutch head 23, as is seen most clearly in Figure 2.

A cylindrical anvil plate 47 having a central bore 48, to receive the shaft 22, is immovably mounted on the shaft 22, immediately to the rear of the clutch cap 43, by means of the set screw 49.

Reference numeral 50 indicates four equi-spaced ball bearings embedded in the face of the plate 47, facing away from the cap 43.

A cylindrical mallet member 51 having a central bore 52, to receive the shaft 22 is mounted on the shaft 22, and free to rotate or slide relative said shaft.

The mallet 51 has four rising cam teeth 53 arranged in a circle centered on the bore 52. Each cam tooth has a flat striking face 64 at its high point.

The mallet 51 is adapted to bear against the anvil plate at each striking face 64 with the anvil balls 50 positioned between the cam teeth as shown in Figure 2.

The mallet member 51 also has a longitudinally extending slot 55 cut in its outer face, as seen in Figure 3.

A mallet cap 57 having a central bore 58 to receive the shaft 22 therethrough, and an interior cavity 59 of a diameter adapted to fit over the outside of the mallet member 51, is connected to the mallet member 51 through a ball 60 embedded in the wall of the cavity 59 which engages the mallet slot 55.

The so mounted mallet cap 57 is free to rotate on the shaft 22 with the mallet member 51, while the mallet member is free to reciprocate relative to the cap 57 by reason of the connection between the slot 55 and the ball 60.

A coil spring 56 is nested between a counter bore 54 in the mallet 51 and the rear end of the cap cavity 59. The cap 57 is positioned on the shaft by means of a lock collar 62 which bears against two washers 61 next to the cap 57. The collar is locked in place by a set screw 63. It will be evident that the spring 56 acts to bias the mallet 51 against the anvil plate 47. The amount of pressure being determined by the compression of the spring due to the position of the collar 62 which prevents the cap 57 from moving away from the anvil plate 47.

In operating the device, a conventional socket wrench unit 65 of suitable size to fit over the head of the screw which is to be driven home, is mounted on stud 39 as seen in Figures 1 and 2.

It will be evident that when the body 26 is made to rotate, the stud 39 and its engaged socket wrench 65 will also rotate.

The only driving connection between the shaft 22 and the body member 26 is the clutch cone 23 with its embedded balls 25 which in turn engaged the slots 29 in the body 26.

It will be evident that since the balls 25 are embedded to only half their diameter in the frusto-conical clutch member 23, they will closely interfit the half-round slots of the conical cavity 27 in the body member 26 when the clutch member is fully fitted against the cavity 27, as illustrated most clearly in Figure 2. In this situation the depth gage pin 38 of the socket wrench post 37 is seated against the face 32 of the body member 26. With the gage pin 38 so located the end face of the anvil section 36 is at its point of least penetration into the body cavity 27.

The body 26 will now turn as a unit with the shaft 22. However if the body unit 26 should be brought to a full stop by reason of the screw engaged by the socket wrench 65 being frictionally held by reason of its penetration into a cinder block, the shaft 22 will try to continue rotating and in doing so will apply a torque to the clutch balls 25 which will act to cause them to try to move longitudinally rearwardly of the slots 29. The whole clutch head 23 will move longitudinally of the slots 29 in the conical cavity 27, toward the large end thereof. As the conical head 23 moves, thus, relative the conical cavity 27, the radial space between them will increase until a point is reached at which the balls will be clear of the slots 29. This will disengage the body member 26 from the shaft 22, thus instantly relieving the torque applied to the screw engaged by the socket wrench 65. The torque at which such disengagement will be effected is determined by the compression of the spring 42, because in order to effect disengagement the clutch head 23 must move against the spring 42. As soon as the balls 25 are free of the slots 29 they are free to roll on the wall 27 between the slots 29. At the same time the compressive thrust on the spring 42 is released and the spring 42 instantly expands driving the forward or hammer face 24 of the clutch head 23 hard against the anvil section 36 of the socket post 37. As the rotating head 23 turns the balls again roll into locked engagement with the body member slots 29. If the hammer blow of the returning clutch head has not released the screw, so that the resistance it offers to rotation is still greater than the predetermined clutch release torque set by the spring 42, the releasing cycle is again repeated with the resultant termination in a hammer blow against the anvil section 36. This hammering action will continue until the screw being driven is again free to rotate at a torque below the pre-set maximum. The degree of torque and the force of the hammer blows can be regulated by moving the anvil section in or out of the cavity 27.

As stated hereinabove the slots 33 in the end face 32 of the body member 26 are of progressively varying depths, so by removing the post 37 from the bore 28 and replacing it so that the gage pin 38 is seated in one of the slots the end of the anvil section 36 will penetrate to a predetermined depth into the cavity 27. The depth of penetration can be indicated by having a guide numbered arrow 67 on the post 37 and on index point 66 on the body 26.

It will be evident that at greater depths of penetration the anvil 36 will hold the clutch head 23 in positions removed from intimate contact with the cavity wall 27. Thus it will require less turning torque to disengage the balls 25 from the slots 29. Similarly the clutch head 23 will move through a shorter distance to disengage the balls, so that the return impact of its striking face 24 will be less on the anvil 36.

Thus the twisting torque and the strength of the hammer blow can be pre-determined to provide the maximum safe driving speed for a particular screw.

The combination clutch release and hammer, or impact, action, just described only becomes effective after the screw has begun to cut threads to a degree that the material being operated upon offers enough resistance to stop the further rotation of the entering screw.

In starting a fresh screw the unit 20 is mounted in the chuck 21 of an electric drill, as illustrated in Figure 1.

A screw, not shown, is engaged by the socket wrench 65. Upon rotation of the shaft 22 the whole unit 20 will revolve. In order to start the screw in a granular material, such as cinder or concrete block the mallet collar 57 is held by one hand against rotation. This in turn stops rotation of the mallet 51. However the anvil plate 47 continues to rotate carrying its balls 50 past the mallet cam teeth 53. The inclined curvature of the cam teeth, as they are progressively engaged by the balls 50 causes the mallet 51 to move away from the anvil plate 47, against the resistance of the spring 56, compressing the same. As the balls 50 pass beyond the high point of each tooth 53, of the mallet member 51, the spring 56 forces the flat hammer surfaces 64 of each tooth against the anvil plate 47 with a sharp impact. This hammer action is repeated as long as the hand grip cap 57 is held immobile. When a sufficiently deep hole has been formed to cause the screw to start to take hold and form threads, the cap 57 is released and the clutching-impact action of the elements 23 and 26 continues to insure proper driving of the screw without danger of applying a breaking torque.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms

I claim:

1. In combination with a powered chuck, an impact-drive screw driver, comprising in combination, a hollow body member having a driving end for engaging fastening elements in torque transmitting relation, a drive shaft journaled in said body member and adapted to be driven by said chuck, a clutch head mounted at the end of the drive shaft within the body member and spring biased thereagainst in torque transmitting relation, means for disengaging said clutch head from the body member at a pre-determined torque, and spring biased means for returning the clutch head to torque transmitting engagement with the body member, with a sharp impact, when the body torque falls below the pre-determined level.

2. In combination with a powered chuck, an impact-drive screw driver, comprising in combination, a hollow body member having a driving end for engaging fastening elements in torque transmitting relation, the body member also having a conical cavity therein centered on its long axis, the wall of said cavity having a plurality of spaced longitudinally extending slots therein, a drive shaft journaled in said body member and adapted to be driven by said chuck, a conical clutch head of a shape complementary to that of the body cavity, mounted at the end of the drive shaft, within the body member, and normally spring biased thereagainst, said head having paired sets of balls journaled therein, said sets being spaced circumferentially of the head to interfit the aforesaid body cavity slots when the head is in a first position, and to roll on the cavity wall between the slots, when the head is in a second position, means for positioning the clutch head at a pre-determined minimum distance from its mating body cavity wall, whereby the depth of penetration of the clutch head balls in the body slots may be varied between pre-determined limits when the head is in its first position, the disengaging torque between the balls and the slots being proportional to their depth of penetration, and spring biased means for returning the clutch head and contained balls to torque transmitting engagement with the body slots, with a sharp impact, when the head is in its second position.

3. In combination with a powered chuck, an impact-drive, screw driver, comprising in combination, a hollow body member having a frusto-conical cavity therein, centered on its long axis, the wall of said cavity having a plurality of spaced longitudinally extending slots therein, the body member also having a bore through the end thereof at the apex of the frusto-conical cavity, a fastening element engaging post mounted in said bore and adjustable axially thereof between positions of varied penetration into said body cavity, a drive shaft journaled in said body member and adapted to be driven by said chuck, a frusto conical clutch head mounted at the end of the drive shaft within the body member cavity and normally spring biased against the body post, said head having paired sets of balls journaled therein, said sets being spaced circumferentially of the head to interfit the aforesaid body cavity slots when the head is in a first position, and to roll on the cavity wall between the slots when the head is in a second position, the end of the head being spring biased against the body post when in its first position, and being backed away from the post when in its second positon, the clutch head being held in adjusted positions relative to the wall of the body cavity by the body post, whereby the depth of penetration of the clutch balls in the body slots may be varied between pre-determined limits when the head is in its first position, the disengaging torque between the balls and the body slots being proportional to their depth of penetration, and spring means for automatically returning the clutch head and contained balls to torque transmitting engagement with the body slots, with a sharp impact against the body post, when the head is in its second position.

4. A device of the type defined in claim 3, and further distinguished by the drive shaft having an anvil plate mounted thereon, adjacent the body member, said anvil plate having a plurality of spaced balls embedded therein on the side facing away from the body member and arranged in a circle having the drive shaft as a center, a cylindrical hammer member mounted on the shaft and free to rotate relative thereto and to reciprocate longitudinally thereof, said hammer member having a plurality of inclined cam teeth, including terminal flat hammer surfaces, arranged in a circle and adapted to ride on the anvil balls, a hand grip cap sleeve mounted on the shaft, but not anchored thereto, adapted to receive the hammer member therein, said hammer member being pinned to the cap sleeve against relative rotation thereto, but free to reciprocate axially thereof on the shaft, a spring mounted in the sleeve between the end thereof and the hammer member and normally acting to bias said hammer member firmly against the anvil plate, said hammer cam teeth being free to ride upon the anvil plate balls when the shaft is rotating and the hand grip is held stationary, whereby the hammer member is caused to move axially of the shaft, away from the anvil plate, and is then returned thereagainst with a sharp impact under the action of the aforesaid biasing spring as the balls pass beyond the terminal hammer surfaces of the several teeth.

5. A device of the type defined in claim 3 and further distiguished by the body bore being other than round in shape, the body member also having a plane end face at the bore, said end face having a plurality of slots of progressively varied depth encircling said bore end, a fastening element engaging post slidably fitted in said bore, said post having a depth pin engageable with one of the end face slots at a time, to limit the depth of penetration of the post into the bore, and means on the body member for holding said post in said depth adjusted positions.

References Cited in the file of this patent

UNITED STATES PATENTS

| | | |
|---|---|---|
| 2,733,621 | Newman | Feb. 7, 1956 |
| 2,768,546 | Amtsberg | Oct. 30, 1956 |
| 2,784,625 | Maurer | Mar. 12, 1957 |
| 2,792,732 | Brucker | May 21, 1957 |
| 2,809,734 | Graybill | Oct. 15, 1957 |
| 2,834,442 | Sturrock | May 13, 1958 |